United States Patent
Yonezawa et al.

(10) Patent No.: US 9,590,512 B2
(45) Date of Patent: Mar. 7, 2017

(54) POWER SUPPLY APPARATUS

(71) Applicant: FUJITSU LIMITED, Kawasaki-shi, Kanagawa (JP)

(72) Inventors: Yu Yonezawa, Sagamihara (JP); Tomotake Sasaki, Kawasaki (JP); Yoshinobu Matsui, Kawasaki (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 24 days.

(21) Appl. No.: 14/532,091

(22) Filed: Nov. 4, 2014

(65) Prior Publication Data

US 2015/0138851 A1   May 21, 2015

(30) Foreign Application Priority Data

Nov. 20, 2013  (JP) ................. 2013-240127

(51) Int. Cl.
*H02M 5/42*   (2006.01)
*H02M 3/335*  (2006.01)
*H02M 1/42*   (2007.01)
*H02M 1/00*   (2006.01)

(52) U.S. Cl.
CPC ..... *H02M 3/33523* (2013.01); *H02M 1/4225* (2013.01); *H02M 2001/0025* (2013.01); *Y02B 70/126* (2013.01); *Y02P 80/112* (2015.11)

(58) Field of Classification Search
CPC ............... H02M 3/3376; H02M 3/338; H02M 3/33507; H02M 3/33523; H02J 1/102; Y02B 70/126; G05F 1/33
USPC ........ 363/17–18, 21.12, 21.13, 21.15–21.18, 363/65, 84, 89, 90; 323/207, 222
See application file for complete search history.

(56) References Cited

U.S. PATENT DOCUMENTS

| | | | |
|---|---|---|---|
| 2009/0147553 A1* | 6/2009 | Ryu | H02M 3/33592 363/65 |
| 2009/0257258 A1 | 10/2009 | Ayukawa et al. | |
| 2010/0225289 A1* | 9/2010 | Chang | H02M 3/28 323/282 |
| 2010/0246220 A1* | 9/2010 | Irving | H02M 1/4225 363/78 |

FOREIGN PATENT DOCUMENTS

| | | |
|---|---|---|
| JP | 09-201052 | 7/1997 |
| JP | 2005-080486 | 3/2005 |
| JP | 2009-261042 | 11/2009 |

* cited by examiner

*Primary Examiner* — Nguyen Tran
(74) *Attorney, Agent, or Firm* — Fujitsu Patent Center

(57) ABSTRACT

A PFC circuit generates substantially sinusoidal current that is in-phase with AC input voltage to compensate for a power factor. A DC-DC converter converts the voltage of a signal outputted from the PFC circuit to determined voltage. A current change detection section detects an amount of change in current outputted from the DC-DC converter, compares the detected amount of change in current with a threshold set in advance, and if the detected amount of change in current is larger than the threshold, outputs a gain switching signal for raising the gain of voltage outputted from the PFC circuit. The current change detection section outputs a voltage control signal for raising the voltage outputted from the PFC circuit to a determined value. A voltage setting section sets the voltage outputted from the PFC circuit to the determined value on the basis of the voltage control signal.

5 Claims, 16 Drawing Sheets

CASE WHERE VOLTAGE CONTROL SIGNAL IS NOT OUTPUTTED $$Vs = \frac{R6}{(R5+R6)} \cdot V1$$

CASE WHERE VOLTAGE CONTROL SIGNAL IS OUTPUTTED

COMBINED RESISTANCE OBTAINED BY CONNECTING RESISTORS R4 AND R6 IN PARALLEL ⇒ $Rc = \dfrac{R4 \cdot R6}{(R4+R6)}$ $$Vs = \frac{\frac{R4 \cdot R6}{(R4+R6)}}{R5 + \frac{R4 \cdot R6}{(R4+R6)}} \cdot V1 = \frac{Rc}{(R5+Rc)} \cdot V1$$

POWER SUPPLY APPARATUS

CROSS-REFERENCE TO RELATED APPLICATION

This application is based upon and claims the benefit of priority of the prior Japanese Patent Application No. 2013-240127, filed on Nov. 20, 2013, the entire contents of which are incorporated herein by reference.

FIELD

The embodiment discussed herein is related to a power supply apparatus.

BACKGROUND

In order to suppress harmonics of an input signal, usually a PFC (Power Factor Correction) circuit is used in a switching power supply which performs AC (Alternating Current)-DC (Direct Current) conversion.

A PFC circuit generates current which is in-phase with AC input voltage and which is substantially sinusoidal. By doing so, the PFC circuit suppresses harmonics and improves a power factor.

Formerly the following technique was proposed. If a detected value of current outputted from a DC-DC converter which converts voltage outputted from a PFC circuit to determined voltage is smaller than a set value, then the operation of the PFC circuit is stopped.

Japanese Laid-open Patent Publication No. 09-201052

If there is a load fluctuation, such as a sudden increase in load current, during the operation of a switching power supply, voltage outputted from a PFC circuit may fall and become smaller than a determined value. This causes a decrease in the efficiency of the switching power supply.

SUMMARY

According to an aspect, there is provided a power supply apparatus including a PFC circuit configured to generate current that is in-phase with AC input voltage and that is substantially sinusoidal to compensate for a power factor, a DC-DC converter configured to convert voltage of a signal outputted from the PFC circuit to determined voltage, and a current change detection section configured to detect an amount of a change in current outputted from the DC-DC converter and output, at the time of the detected amount of the change in current being larger than a threshold, a gain switching signal for raising gain of voltage outputted from the PFC circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
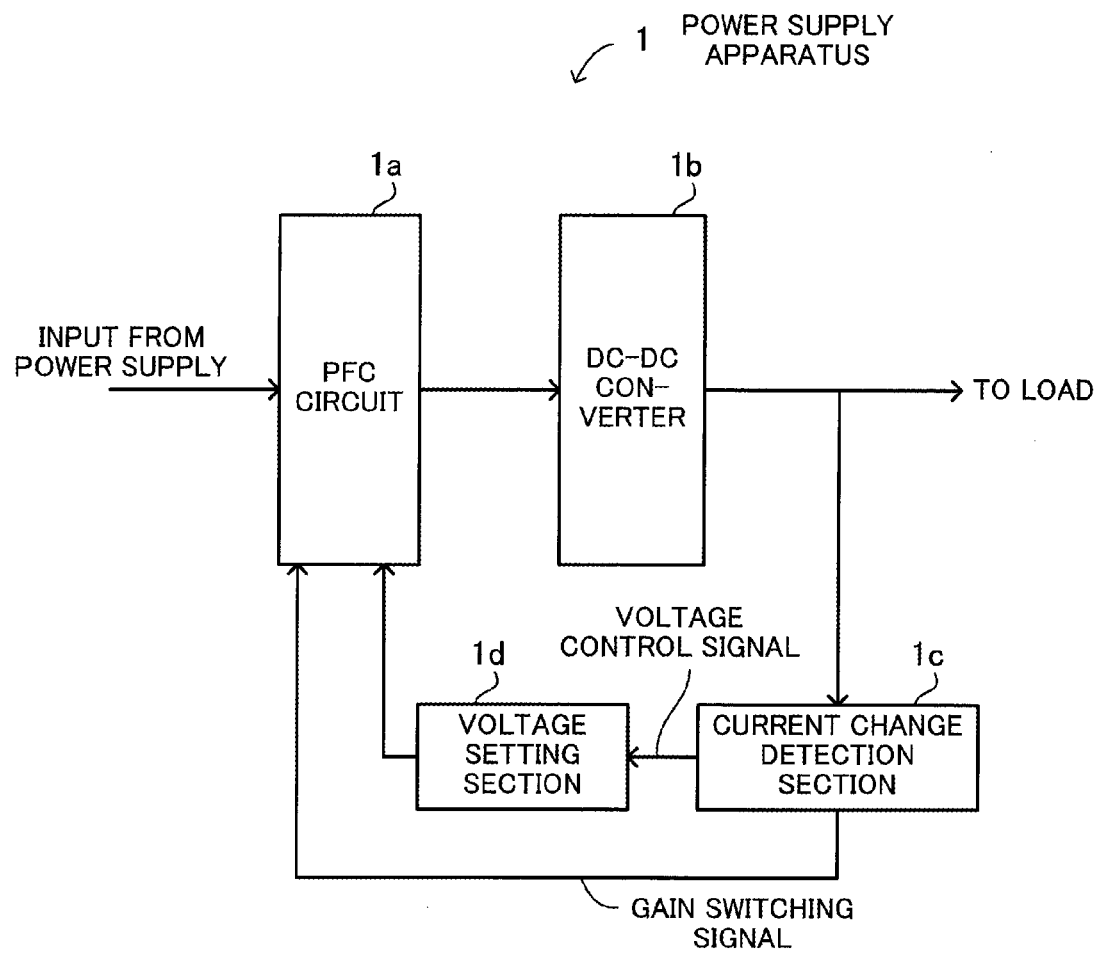
FIG. 1 illustrates an example of the structure of a power supply apparatus.

Embodiments will now be described with reference to the accompanying drawings, wherein like reference numerals refer to like elements throughout. FIG. 1 illustrates an example of the structure of a power supply apparatus. A power supply apparatus 1 includes a PFC circuit 1a, a DC-DC converter 1b, a current change detection section 1c, and a voltage setting section 1d.

The PFC circuit 1a generates current which is in-phase with AC input voltage and which is substantially sinusoidal to compensate for a power factor. The DC-DC converter 1b converts the voltage of a signal outputted from the PFC circuit 1a to determined voltage.

The current change detection section 1c detects an amount of a change in current outputted from the DC-DC converter 1b and compares the detected amount of the change in current with a threshold set in advance. If the amount of the change in current is larger than the threshold, then the current change detection section 1c outputs a gain switching signal for raising the gain of voltage outputted from the PFC circuit 1a, and feeds back the gain switching signal to the PFC circuit 1a.

Furthermore, the current change detection section 1c outputs a voltage control signal for raising the voltage outputted from the PFC circuit 1a to a determined value. The voltage setting section 1d sets voltage outputted from the PFC circuit 1a to a determined value on the basis of a voltage control signal.

As has been described, with the power supply apparatus 1 an amount of a change in current outputted from the DC-DC converter 1b located at a stage behind the PFC circuit 1a is detected. If the amount of the change in current is larger than the threshold, then control is exercised for raising the gain of the PFC circuit 1a by a certain amount. This checks a decrease in the efficiency of a switching power supply caused at the time of load fluctuations.

The contents of the operation of a PFC circuit and problems to be solved will now be described by the use of FIGS. 2 through 7 before the details of an embodiment will be described. First the cause of the generation of harmonics will be described by the use of FIGS. 2 and 3.

Figure 2:
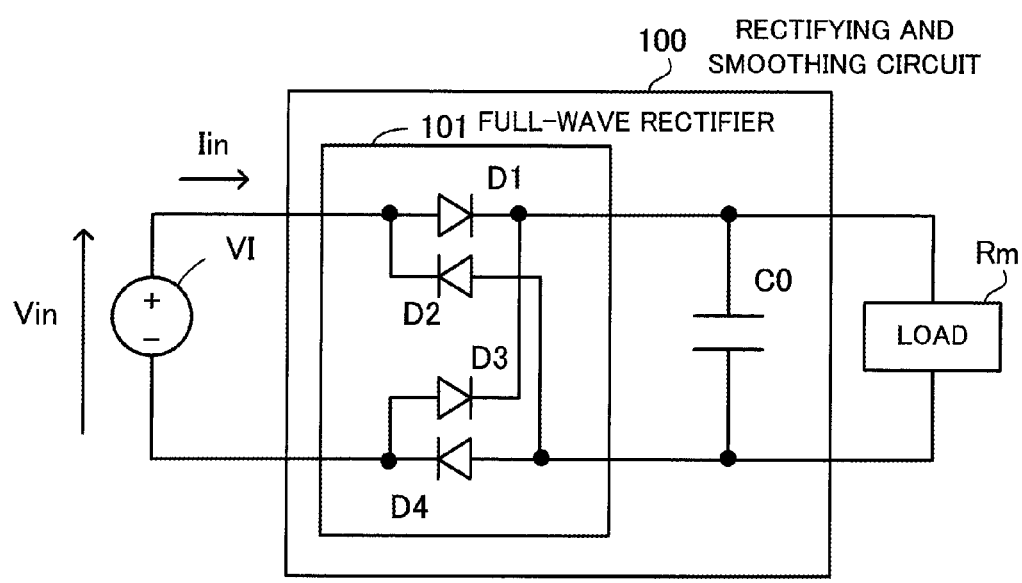
FIG. 2 illustrates an example of the structure of a rectifying and smoothing circuit.

FIG. 2 illustrates an example of the structure of a rectifying and smoothing circuit. A rectifying and smoothing circuit 100 indicates an input section of a switching power supply not including a PFC circuit, and includes a full-wave rectifier 101 and a smoothing capacitor C0.

The full-wave rectifier 101 is formed of a diode bridge including diodes D1 through D4. Components, such as a DC-DC converter, located at stages behind the rectifying and smoothing circuit 100 are not illustrated in FIG. 2.

Each element is connected in the following way. A positive terminal (+) of an input power supply VI (commercial power supply) is connected to an anode of the diode D1 and a cathode of the diode D2. A negative terminal (−) of the input power supply VI is connected to an anode of the diode D3 and a cathode of the diode D4.

A cathode of the diode D1 is connected to a cathode of the diode D3, one end of the capacitor C0, and one end of a load Rm. An anode of the diode D2 is connected to an anode of the diode D4, the other end of the capacitor C0, and the other end of the load Rm. The load Rm corresponds to, for example, an information processing apparatus such as a server.

The operation of the rectifying and smoothing circuit 100 is as follows. The full-wave rectifier 101 full-wave-rectifies AC voltage Vin inputted from the input power supply VI. The smoothing capacitor C0 smooths a signal outputted from the full-wave rectifier 101.

It is possible to make AC-DC conversion by the use of these basic components included in the rectifying and smoothing circuit 100. However, if only these components are used, the waveform of current Iin is distorted at the time of applying the AC voltage Vin.

Figure 3:
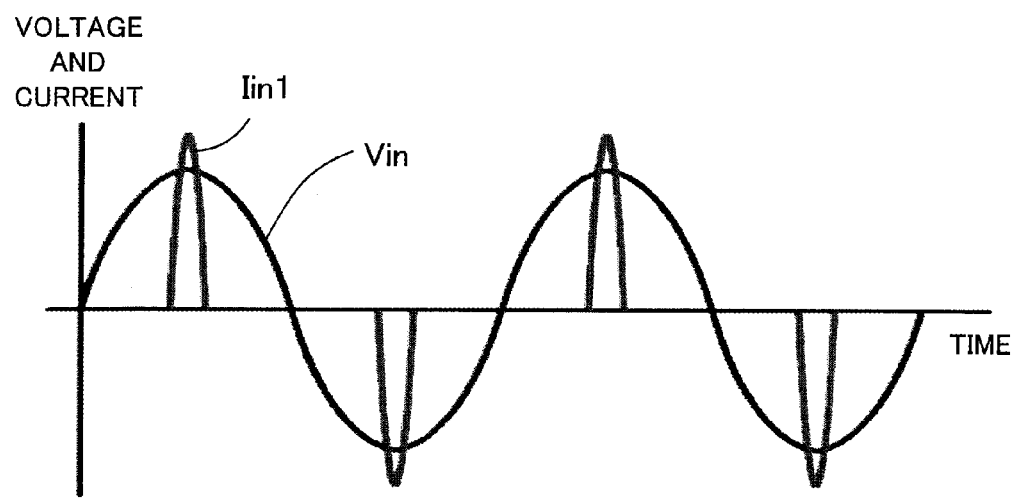
FIG. 3 illustrates harmonics.

FIG. 3 illustrates harmonics. In FIG. 3, a vertical axis indicates voltage and current and a horizontal axis indicates time. In the rectifying and smoothing circuit 100, the AC voltage Vin inputted from the input power supply VI is rectified by the full-wave rectifier 101 and is applied to the smoothing capacitor C0.

Current does not flow to the smoothing capacitor C0 during a period during which the AC voltage Vin is lower than terminal voltage of the smoothing capacitor C0. When the AC voltage Vin rises and exceeds the terminal voltage of the smoothing capacitor C0, charging the smoothing capacitor C0 begins and current flows to the smoothing capacitor C0.

As a result, as illustrated in FIG. 3, the waveform of the AC voltage Vin looks like a sine wave. However, the waveform of input current Iin1 is not a sine wave and is distorted. Time during which the input current Iin1 flows is short compared with time during which the AC voltage Vin is applied. In addition, a peak value of the input current Iin1 is high and the waveform of the input current Iin1 is pointed.

The waveform of the input current Iin1 includes a component whose frequency is higher than the frequency (which is usually 50 or 60 Hz) of a fundamental wave and whose frequency is integer times as high as the frequency of the fundamental wave. A component whose frequency is integer times as high as the frequency of the fundamental wave is referred to as a harmonic.

As stated above, if the structure of the rectifying and smoothing circuit 100 is adopted, the waveform of input current is distorted and discontinuous harmonics are generated. Furthermore, if a harmonic having a frequency integer times 50 or 60 Hz flows to a commercial power supply, power transmission and distribution equipment or the like may be damaged.

The operation of a PFC circuit for improving a power factor will now be described by the use of FIGS. 4 and 5. If the difference in phase between AC voltage and current is Φ, then a power factor is given by cos Φ (alternatively, a power factor may be defined as the ratio of effective power to apparent power).

If both of the waveform of voltage and the waveform of current are sine waves, then the difference in phase between them is 0. As a result, a power factor is 1 and an ideal state is realized. On the other hand, as the waveform of current is distorted with respect to the waveform of voltage, a power factor becomes smaller than 1. Therefore, making a power factor approach 1 leads to suppressing harmonic current.

Figure 4:
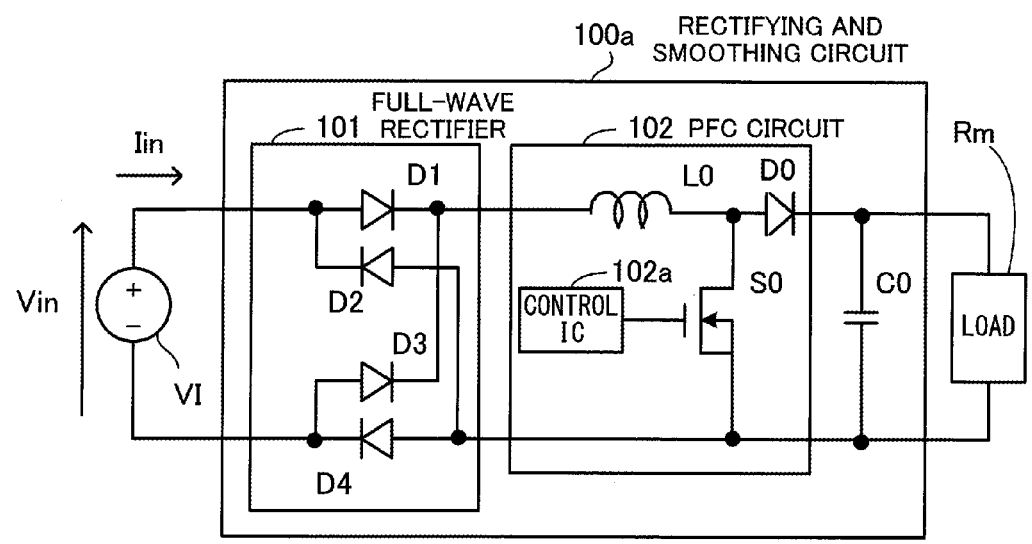
FIG. 4 illustrates an example of the structure of a rectifying and smoothing circuit.

FIG. 4 illustrates an example of the structure of a rectifying and smoothing circuit. A rectifying and smoothing circuit 100a indicates an input section of a switching power supply including a PFC circuit, and includes a full-wave rectifier 101, a PFC circuit 102, and a smoothing capacitor C0.

The PFC circuit 102 is a step-up PFC circuit including a step-up coil L0, a switching element S0, a diode D0, and a control IC (Integrated Circuit) 102a. Furthermore, an n-channel MOSFET (Metal-Oxide Semiconductor Field Effect Transistor) is used as the switching element S0. Components, such as a DC-DC converter, located at stages behind the rectifying and smoothing circuit 100a are not illustrated in FIG. 4.

Each element is connected in the following way. A positive terminal (+) of an input power supply VI is connected to an anode of a diode D1 and a cathode of a diode D2. A negative terminal (−) of the input power supply VI is connected to an anode of a diode D3 and a cathode of a diode D4.

A cathode of the diode D1 is connected to a cathode of the diode D3 and one end of the step-up coil L0. The other end of the step-up coil L0 is connected to a drain of the switching element S0 and an anode of the diode D0.

A cathode of the diode D0 is connected to one end of the capacitor C0 and one end of a load Rm. An anode of the diode D2 is connected to an anode of the diode D4, a source of the switching element S0, the other end of the capacitor C0, and the other end of the load Rm.

The control IC 102a is connected to a gate of the switching element S0 and outputs a switching control signal for turning on or off the switching element S0.

Figure 5:
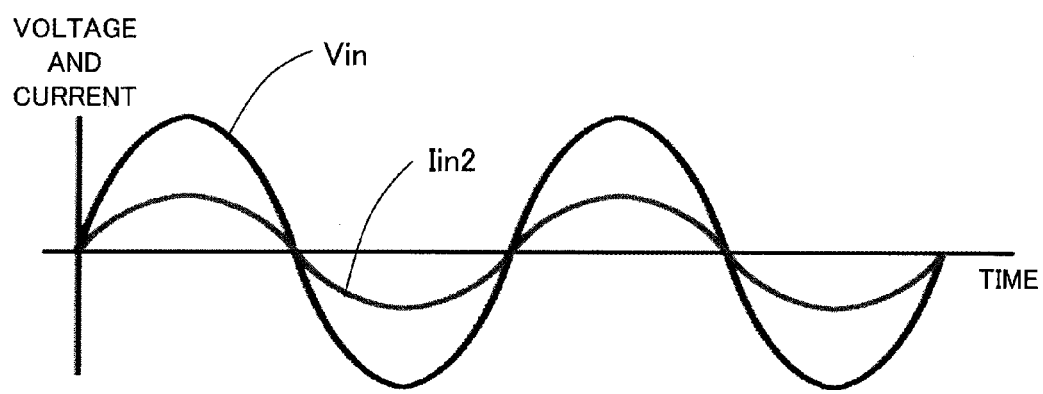
FIG. 5 illustrates a state in which harmonics are suppressed.

FIG. 5 illustrates a state in which harmonics are suppressed. In FIG. 5, a vertical axis indicates voltage and current and a horizontal axis indicates time. In the PFC circuit 102, high-speed switching of the switching element S0 is performed to control the amount of current which flows from the diode D0 to the smoothing capacitor C0.

By incorporating the above PFC circuit 102, current Iin2 which is in-phase with AC voltage Vin and which is substantially sinusoidal is generated. This makes it possible to suppress harmonics and improve a power factor.

There is a restriction on harmonic current for all power supplies which output 75 watts or more of power. The value of harmonic current to be suppressed by PFC circuits is provided by IEC 61000-3-2 of IEC (International Electrotechnical Commission).

Figure 6:
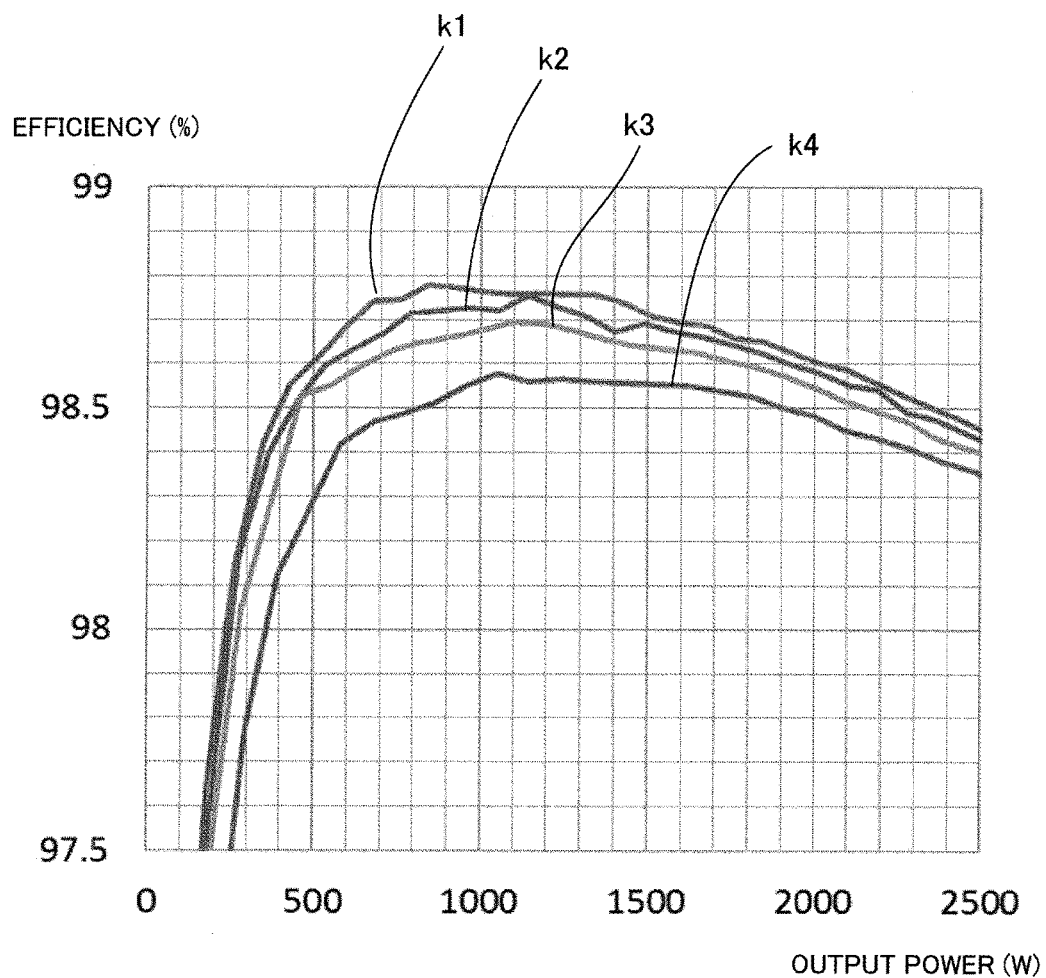
FIG. 6 indicates a change in the efficiency of a switching power supply.

Problems to be solved by the embodiment will now be described by the use of FIGS. 6 and 7. FIG. 6 indicates a change in the efficiency of a switching power supply. In FIG. 6, a vertical axis indicates efficiency (%) and a horizontal axis indicates output power (W). Furthermore, graphs k1 through k4 indicate cases where voltage outputted from a PFC circuit is 370 V, 387 V, 400 V, and 420 V respectively.

One of the characteristics of a switching power supply is efficiency. Efficiency is an index which indicates how input power is utilized without being wasted (how much input power is not transformed into heat in an apparatus but is conducted as output power), and is expressed by the ratio of output power to input power. Accordingly, high efficiency means that the amount of heat generated is small and that wasteful transformation of electric power into heat is small.

As illustrated in FIG. 4, usually a PFC circuit is a step-up circuit. With a step-up PFC circuit an increase in output voltage causes an increase in switching current which flows through a FET that is a switching element.

In this case, an increase in switching current leads to a great loss (large amount of heat generated), so the efficiency of a switching power supply decreases. Accordingly, in order to check a decrease in the efficiency of the switching power supply, voltage outputted from the PFC circuit is decreased and switching current is decreased.

In FIG. 6, the same output power is generated in the cases which is indicated by the graphs k1 through k4 and in which voltage outputted from the step-up PFC circuit is 370 V, 387 V, 400 V, and 420 V respectively. As can be seen from FIG. 6, as voltage outputted from the step-up PFC circuit increases, the efficiency decreases. As voltage outputted from the step-up PFC circuit decreases, the efficiency increases.

As indicated in FIG. 6, lower voltage outputted from the PFC circuit leads to the improvement of the efficiency of the switching power supply. Accordingly, it is desirable to make voltage outputted from the PFC circuit as low as possible in a determined range, specifically, in a range of voltage inputted to a DC-DC converter located at a stage behind the PFC circuit.

Figure 7:
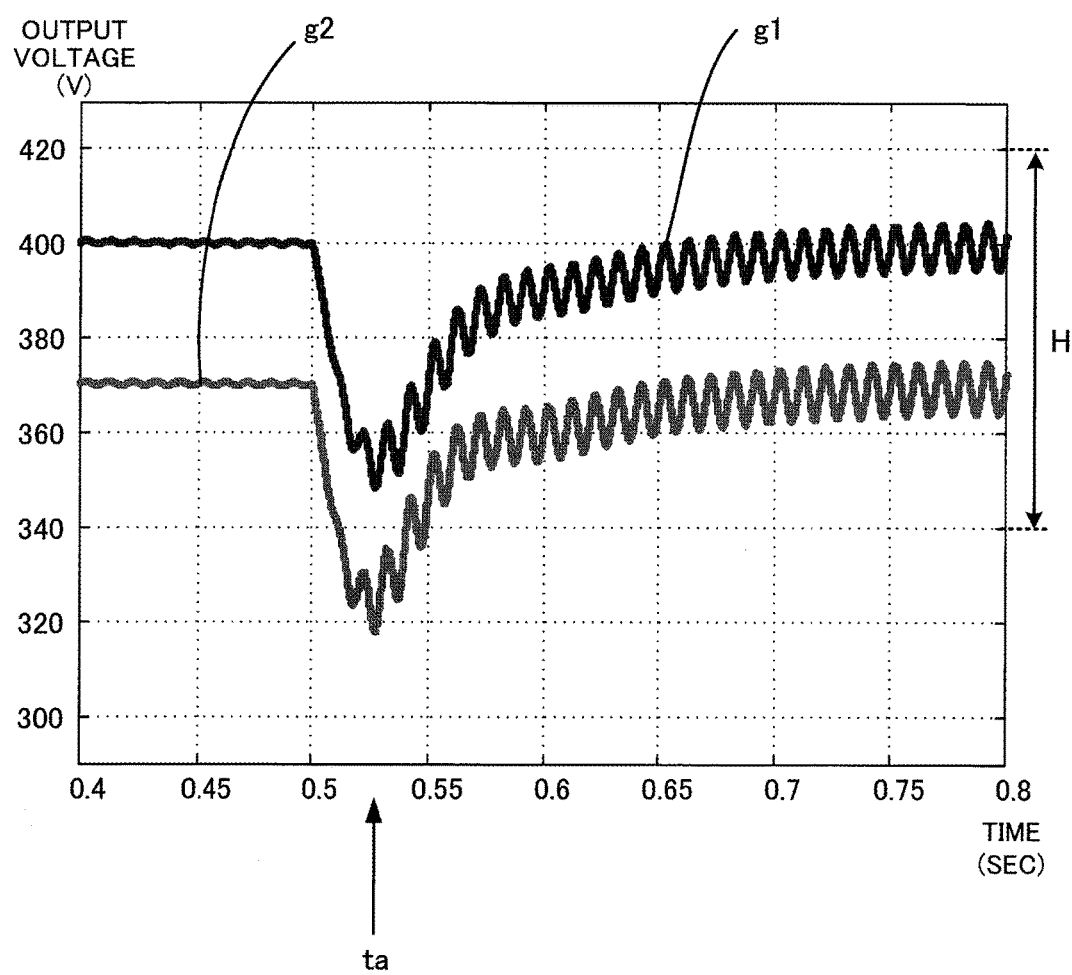
FIG. 7 indicates a fall in output voltage at the time of load fluctuations.

FIG. 7 indicates a fall in output voltage at the time of load fluctuations. In FIG. 7, a vertical axis indicates voltage (V) outputted from a PFC circuit and a horizontal axis indicates time (sec). A range H indicates a range of voltage inputted to a DC-DC converter located at a stage behind the PFC circuit.

In FIG. 7, the input voltage range H is 340 to 420 V. Input voltage in this range meets the operation specification of the DC-DC converter and the efficiency of a switching power supply does not decrease.

A graph g1 indicates a change in output voltage at the time of operating the switching power supply with output voltage from the PFC circuit initially set to 400 V in the input voltage range H for the DC-DC converter.

In addition, a graph g2 indicates a change in output voltage at the time of operating the switching power supply with output voltage from the PFC circuit initially set to 370 V in the input voltage range H for the DC-DC converter.

In both of the cases of the graphs g1 and g2, in the beginning there are no load fluctuations. At time ta load fluctuations, such as a sudden increase in load current, take place. In the case of the graph g1, output voltage set to 400 V falls to 350 V at the time ta at which the load fluctuations take place. However, even when output voltage falls to 350 V, output voltage is in the input voltage range H, that is to say, in a tolerance range.

In the case of the graph g2, on the other hand, output voltage set to 370 V falls to a value close to 320 V at the time ta at which the load fluctuations take place. This value close to 320 V is lower than the lower limit value 340 V of the input voltage range H. Output voltage from the PFC circuit (input voltage to the DC-DC converter) which is lower than the lower limit value of the tolerance range does not meet the operation specification of the DC-DC converter.

As stated above, when the switching power supply is operated with output voltage from the PFC circuit set to a low value in the input voltage range H for the DC-DC converter, the output voltage from the PFC circuit may become lower than the lower limit value of the tolerance range due to sudden load fluctuations. This decreases the efficiency of the switching power supply.

The embodiment described below is given in view of the above problems. There is provided a power supply apparatus which checks a decrease in the efficiency at the time of load fluctuations.

Figure 8:
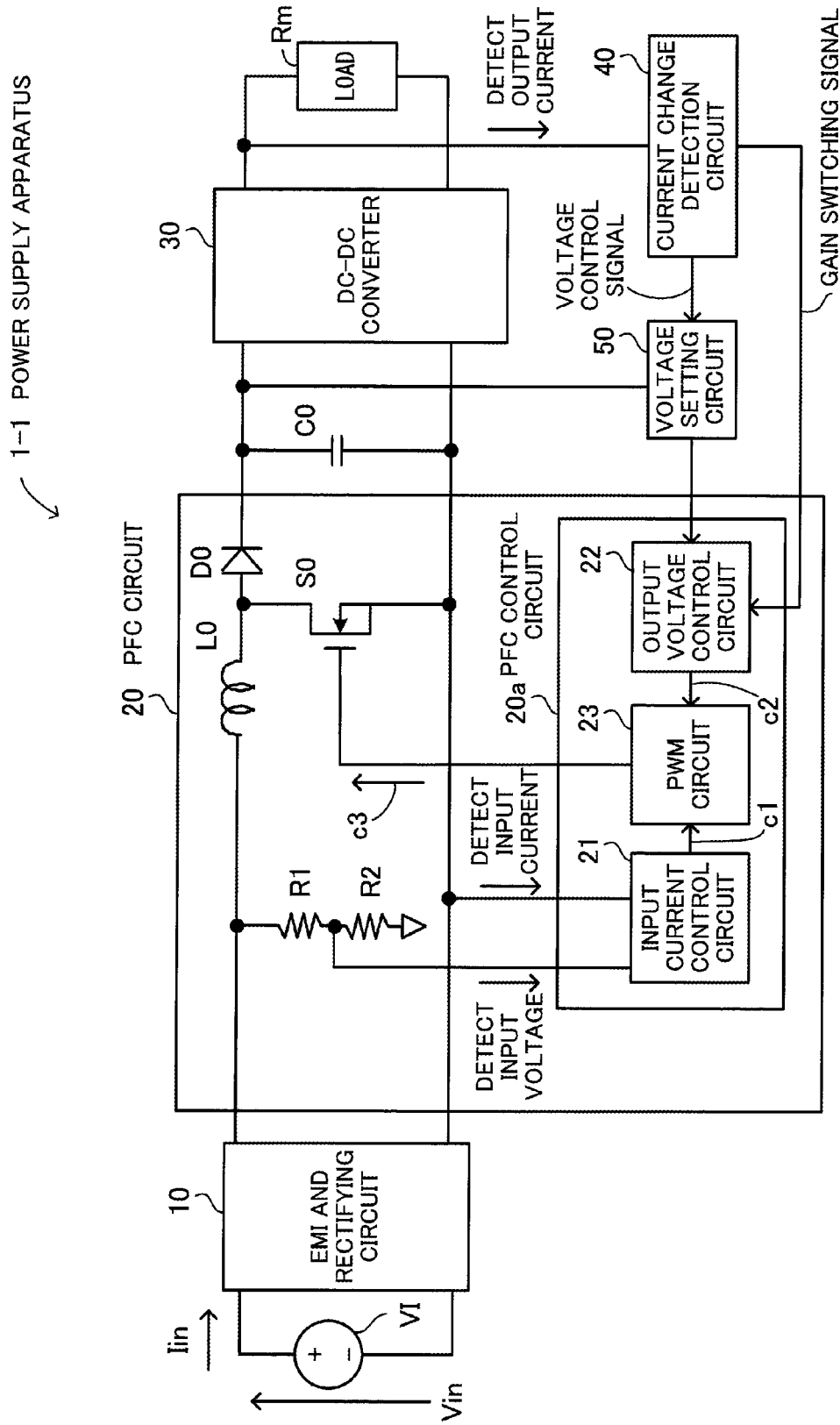
FIG. 8 illustrates an example of the structure of a power supply apparatus.

A power supply apparatus according to an embodiment will now be described in detail. FIG. 8 illustrates an example of the structure of a power supply apparatus. A power supply apparatus 1-1 includes an EMI (ElectroMagnetic Interference) and rectifying circuit 10, a PFC circuit 20, a smoothing capacitor C0, a DC-DC converter 30, a current change detection circuit 40, and a voltage setting circuit 50.

In addition, the PFC circuit 20 is a step-up PFC circuit and includes resistors R1 and R2, a step-up coil L0, a switching element S0, a diode D0, and a PFC control circuit 20a. Furthermore, the PFC control circuit 20a includes an input current control circuit 21, an output voltage control circuit 22, and a PWM (Pulse Width Modulation) circuit 23.

Connections around the passive elements are made in the following way. One end of the resistor R1 is connected to one output end of the EMI and rectifying circuit 10 and one end of the coil L0. One end of the resistor R2 is connected to the other end of the resistor R1 and an input end (input voltage detection terminal) of the input current control circuit 21. The other end of the resistor R2 is connected to GND.

The other end of the coil L0 is connected to a drain of the switching element S0 and an anode of the diode D0. A cathode of the diode D0 is connected to one end of the capacitor C0, an input end of the voltage setting circuit 50, and one input end of the DC-DC converter 30.

A gate of the switching element S0 is connected to an output end (switching control signal output terminal) of the PWM circuit 23. A source of the switching element S0 is connected to the other output end of the EMI and rectifying circuit 10, an input end (input current detection terminal) of the input current control circuit 21, the other end of the capacitor C0, and the other input end of the DC-DC converter 30.

The EMI and rectifying circuit 10 full-wave-rectifies AC voltage Vin inputted from an input power supply VI and reduces noise caused by EMI. The PFC circuit 20 generates current which is in-phase with the AC voltage Vin and which is substantially sinusoidal to compensate for a power factor.

The smoothing capacitor C0 smooths a voltage signal outputted from the PFC circuit 20. The DC-DC converter 30 converts direct-current voltage outputted from the smoothing capacitor C0 to determined voltage and supplies it to a load Rm.

The current change detection circuit 40 monitors current (DC-DC output current) outputted from the DC-DC converter 30, detects an amount of change in the current, and generates a gain switching signal and a voltage control signal on the basis of a detection result. The voltage setting circuit 50 sets a voltage value to be outputted from the PFC circuit 20 on the basis of the voltage control signal.

The input current control circuit 21 detects input voltage Vi and input current Iin via the EMI and rectifying circuit 10 and generates a control signal c1 for generating current which is in-phase with the AC voltage Vin and which is substantially sinusoidal.

The output voltage control circuit 22 sets gain on the basis of the gain switching signal by, for example, switching resistance division ratio, and generates a control signal c2 for making voltage outputted from the PFC circuit 20 equal to the voltage value set by the voltage setting circuit 50. The PWM circuit 23 outputs a switching control signal c3 on the basis of the control signals c1 and c2 to exercise switching control (on-off control) of the switching element S0.

The degree of control exercised in the output voltage control circuit 22 over the differential between a target value and an actual value is determined by its gain. As the gain becomes higher, capability to correct deviation from the target value improves. Accordingly, if the gain of, for example, the output voltage control circuit 22 is high, the deviation of output voltage from the target value is corrected immediately and the output voltage is set to the correct value.

Figure 9:
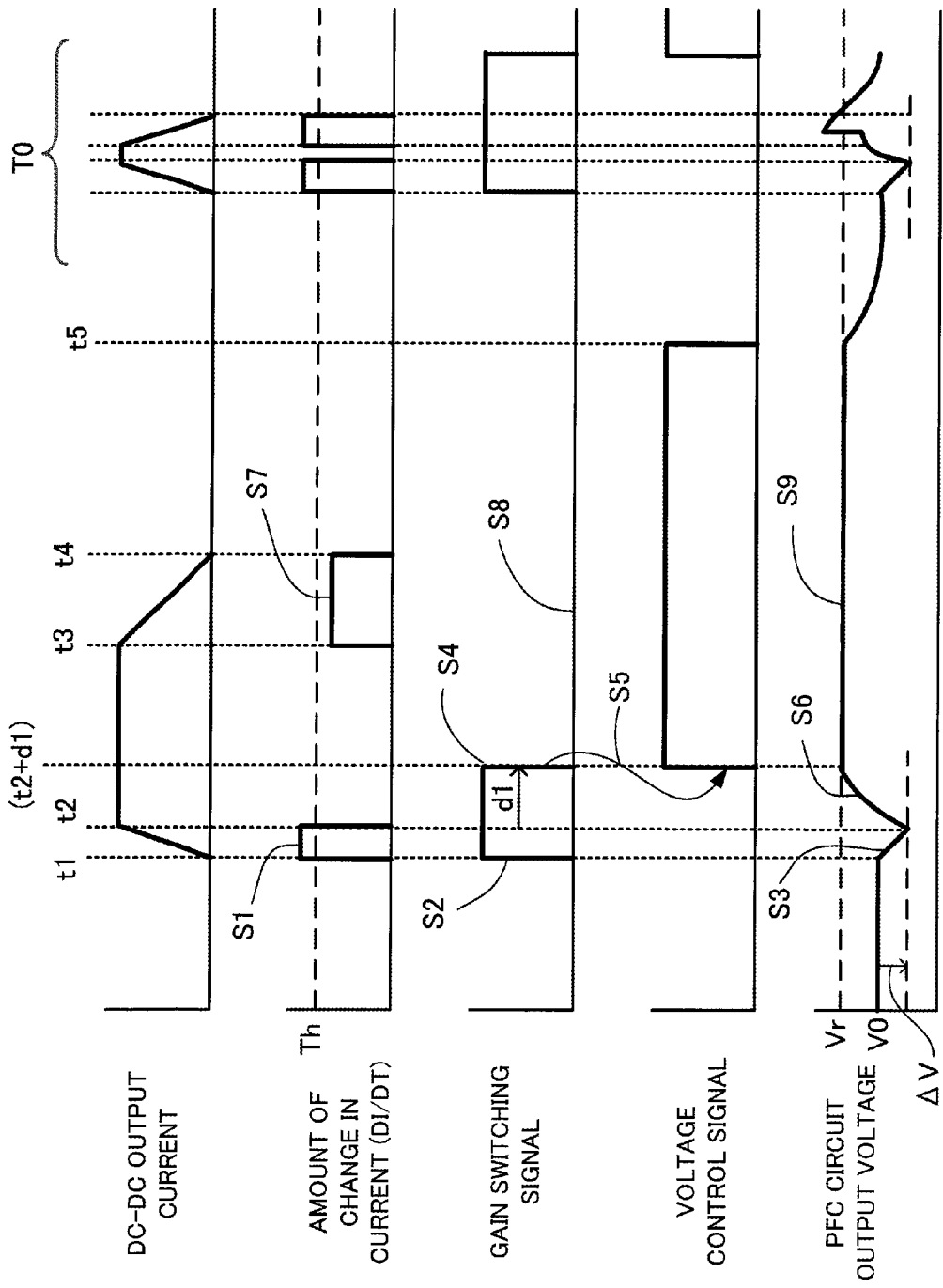
FIG. 9 is a timing chart of the operation of the power supply apparatus.

The operation of the power supply apparatus 1-1 will now be described by the use of timing charts. FIG. 9 is a timing chart of the operation of the power supply apparatus.

(Time t1 to t2)

It is assumed that a load fluctuation causes an increase in load current. At this time output current from the DC-DC converter 30 also increases. The current change detection circuit 40 recognizes the increase in load current by monitoring the output current from the DC-DC converter 30.

(S1) The current change detection circuit 40 detects an amount of a change (di/dt) in the output current from the DC-DC converter 30 in the interval from the time t1 to the time t2. The current change detection circuit 40 then compares the detected amount of the change in the output current with a threshold Th set in advance.

(S2) If the amount of the change in the output current is larger than the threshold Th, then the current change detection circuit 40 outputs a gain switching signal for increasing gain currently set in the PFC circuit 20 by a certain amount.

In this case, the current change detection circuit 40 continues outputting a gain switching signal for a time longer by time d1 than the interval during which the DC-DC output current is changing, that is to say, until time (t2+d1). Gain is increased by the certain amount in the PFC circuit 20 while the gain switching signal is being applied.

(S3) The increase in load current leads to a drop in output voltage from the PFC circuit 20. However, the gain switching signal is being supplied from the current change detection circuit 40 to the PFC circuit 20. Accordingly, output control is exercised by increasing gain.

As a result, even when the increase in load current takes place, the drop in output voltage from the PFC circuit 20 is limited to ΔV. Even when initial output voltage V0 from the PFC circuit 20 decreases by the voltage ΔV, gain is increased in the PFC circuit 20 so that output voltage from the PFC circuit 20 will fall within the input voltage range H for the DC-DC converter 30.

As stated above, if an amount of a change in the DC-DC output current is larger than the threshold, then the current change detection circuit 40 recognizes that a load fluctuation has taken place, and outputs a gain switching signal to control a drop in output voltage from the PFC circuit 20 caused by the load fluctuation.

This reliably checks a drop in voltage caused by the initial load fluctuation (first load fluctuation) which takes place after a state in which there is no load fluctuation. Accordingly, a decrease in the efficiency of the switching power supply caused by this load fluctuation is checked.

(Time t2 to t3)

There is no load fluctuation and the increase in load current stops. Accordingly, the increase in the output current from the DC-DC converter 30 also stops and the output current from the DC-DC converter 30 is constant.

(S4) The current change detection circuit 40 discontinues outputting the gain switching signal at the time (t2+d1), and returns gain in the PFC circuit 20 to an original value.

(S5) The current change detection circuit 40 outputs a voltage control signal to the PFC circuit 20 at the time (t2+d1). The voltage control signal is used for making the PFC circuit 20 output voltage at a determined value Vr.

(S6) The output voltage from the PFC circuit 20 is rising to the determined value Vr during the interval from the time t2 to the time (t2+d1).

(Time t3 to t4)

It is assumed that a load fluctuation causes a decrease in load current and that the output current from the DC-DC converter 30 decreases.

(S7) The current change detection circuit 40 detects an amount of a change (di/dt) in the output current from the DC-DC converter 30 in the interval from the time t3 to the time t4. The current change detection circuit 40 then compares the detected amount of the change in the output current with the threshold Th set in advance.

(S8) If the amount of the change in the output current is not larger than the threshold Th, then the current change detection circuit 40 does not output a gain switching signal.

(Time (t2+d1) to t5)

(S9) The current change detection circuit 40 sets the output voltage from the PFC circuit 20 to the determined value Vr during the interval from the time (t2+d1) to the time t5 by applying the voltage control signal to the PFC circuit 20.

As stated above, the current change detection circuit 40 discontinues outputting a gain switching signal. Taking this opportunity, the current change detection circuit 40 outputs a voltage control signal for a certain period of time for raising the output voltage from the PFC circuit 20 to a determined value. This controls a decrease in the output voltage from the PFC circuit 20 caused by a load fluctuation (second load fluctuation) which may take place in the certain period of time.

As a result, a decrease in the output voltage from the PFC circuit 20 caused by the load fluctuation (second load fluctuation) which may take place after the initial load fluctuation (first load fluctuation) which takes place after a state in which there is no load fluctuation is also checked effectively.

Figure 10:
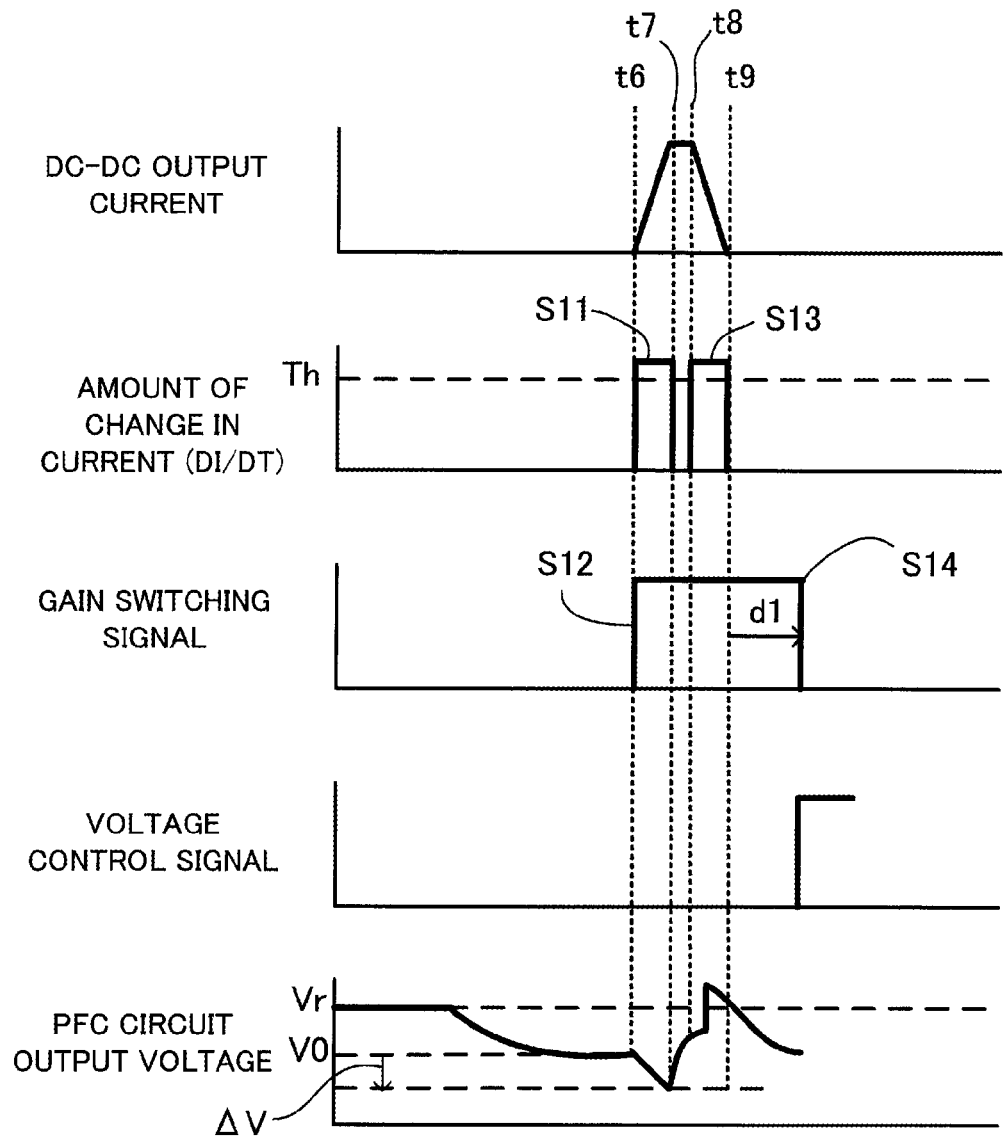
FIG. 10 is a timing chart of the operation of the power supply apparatus.

FIG. 10 is a timing chart of the operation of the power supply apparatus. FIG. 10 indicates an interval TO of FIG. 9.

(Time t6 to t9)

In the interval from the time t6 to the time t7, it is assumed that a load fluctuation causes an increase in load current and that the output current from the DC-DC converter 30 also increases. Furthermore, in the interval of the time t8 to t9, it is assumed that a load fluctuation causes a decrease in load current and that the output current from the DC-DC converter 30 also decreases. It is assumed that a time interval between the time t7 and the time t8 after the increase in load current before the decrease in load current is shorter than a time interval between the time t2 and the time t3 indicated in FIG. 9.

(S11) The current change detection circuit 40 detects an amount of a change (di/dt) in the output current from the DC-DC converter 30 in the interval from the time t6 to the time t7 and compares the detected amount of the change in the output current with the threshold Th set in advance.

(S12) The amount of the change in the output current from the DC-DC converter 30 in the interval from the time t6 to the time t7 is larger than the threshold Th, so the current change detection circuit 40 outputs a gain switching signal to the PFC circuit 20. In this case, the current change detection circuit 40 continues outputting a gain switching signal for a time longer by the time d1 than the interval during which the output current from the DC-DC converter 30 is changing.

(S13) The current change detection circuit 40 detects an amount of a change (di/dt) in the output current from the DC-DC converter 30 in the interval from the time t8 to the time t9 and compares the detected amount of the change in the output current with the threshold Th set in advance.

(S14) The amount of the change in the output current from the DC-DC converter 30 in the interval from the time t8 to the time t9 is larger than the threshold Th, so the current change detection circuit 40 outputs a gain switching signal to the PFC circuit 20. In this case, the current change detection circuit 40 continues outputting a gain switching signal for a time longer by the time d1 than the interval during which the output current from the DC-DC converter 30 is changing.

The gain switching signals are being supplied from the current change detection circuit 40 to the PFC circuit 20. Accordingly, output control is exercised by increasing gain. In this case, the width of the gain switching signals is longer by the time d1 than the interval during which the output current from the DC-DC converter 30 is changing.

If the width of the gain switching signals is equal to the interval during which the output current from the DC-DC converter 30 is changing, the following problem arises. As indicated in FIG. 10, an increase and a decrease in load current may take place in a short period of time. In such a case, the gain switching signals are comb-like high-frequency pulses. However, gain control exercised by the use of high-frequency pulses may cause a circuit malfunction or noise.

Therefore, in this embodiment a gain switching signal whose width is longer by a certain time than an interval during which the output current from the DC-DC converter 30 is changing is generated and outputted. As indicated in FIG. 10, an increase and a decrease in load current may take place in a short period of time. Even in such a case, it is possible to exercise gain control while stabilizing the operation of the PFC circuit 20.

Figure 11:
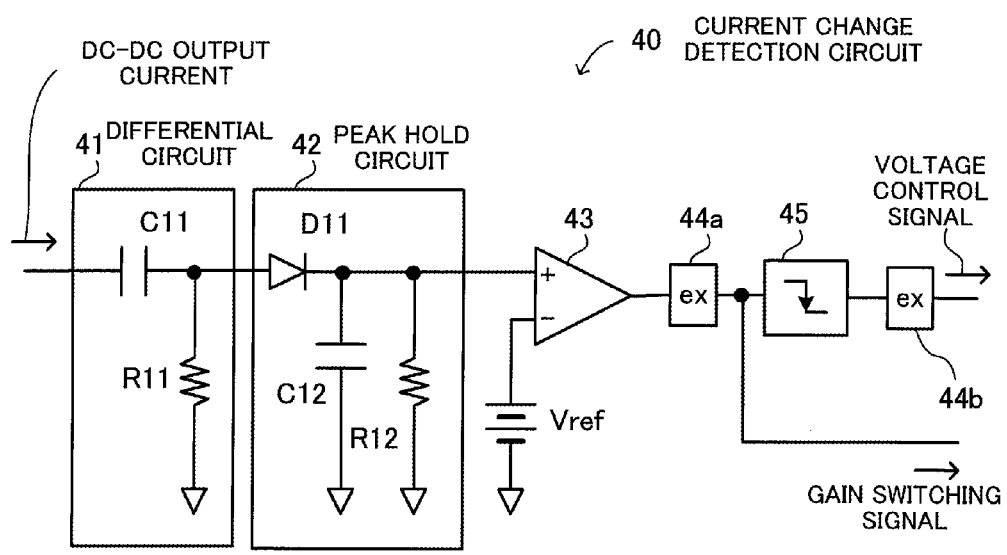
FIG. 11 illustrates an example of the structure of a current change detection circuit.

The structure of the current change detection circuit 40 will now be described. FIG. 11 illustrates an example of the structure of the current change detection circuit. The current change detection circuit 40 includes a differential circuit 41, a peak hold circuit 42, a comparator 43, a reference power supply Vref, expansion circuits 44a and 44b, and an edge detection circuit 45. One-shot circuits (monostable multivibrators) or the like may be used as the expansion circuits 44a and 44b.

The differential circuit 41 includes a capacitor C11 and a resistor R11. The peak hold circuit 42 includes a diode D11, a capacitor C12, and a resistor R12.

Each element is connected in the following way. Current outputted from the DC-DC converter 30 is inputted to one end of the capacitor C11. The other end of the capacitor C11 is connected to one end of the resistor R11 and an anode of the diode D11. The other end of the resistor R11 is connected to GND.

A cathode of the diode D11 is connected to one end of the capacitor C12, one end of the resistor R12, and an input terminal (+) of the comparator 43. The other end of the capacitor C12 and the other end of the resistor R12 are connected to GND.

An input terminal (−) of the comparator 43 is connected to a positive-side power supply terminal of the reference power supply Vref and a negative-side power supply terminal of the reference power supply Vref is connected to GND. An output terminal of the comparator 43 is connected to an input end of the expansion circuit 44a.

An output end of the expansion circuit 44a is connected to an input end of the edge detection circuit 45. Furthermore, a gain switching signal is outputted from the output end of the expansion circuit 44a. An output end of the edge detection circuit 45 is connected to an input end of the expansion circuit 44b. A voltage control signal is outputted from an output end of the expansion circuit 44b.

The differential circuit 41 differential-filters (high-pass-filters) DC-DC output current to generate a current change signal. The peak hold circuit 42 holds a peak value of the current change signal for a certain period of time and outputs a peak hold signal.

The comparator 43 compares the peak hold signal with reference voltage and outputs an H-level signal for an interval for which the level of the peak hold signal is higher than the level of the reference voltage. The width of the H-level signal outputted from the comparator 43 is expanded by a certain time by the expansion circuit 44a and is then outputted as a gain switching signal.

The edge detection circuit 45 detects the falling of the gain switching signal and outputs a pulse signal at the time of the falling of the gain switching signal. The expansion circuit 44b expands the width of the pulse signal and outputs a pulse signal with required width as a voltage control signal.

In the above description, the current change detection circuit 40 is made up of analog circuits. However, the current change detection circuit 40 may be realized by firmware. That is to say, a microcomputer or the like may be used and programs for differential filtering, a threshold comparison process, and the like may be generated.

Figure 12:
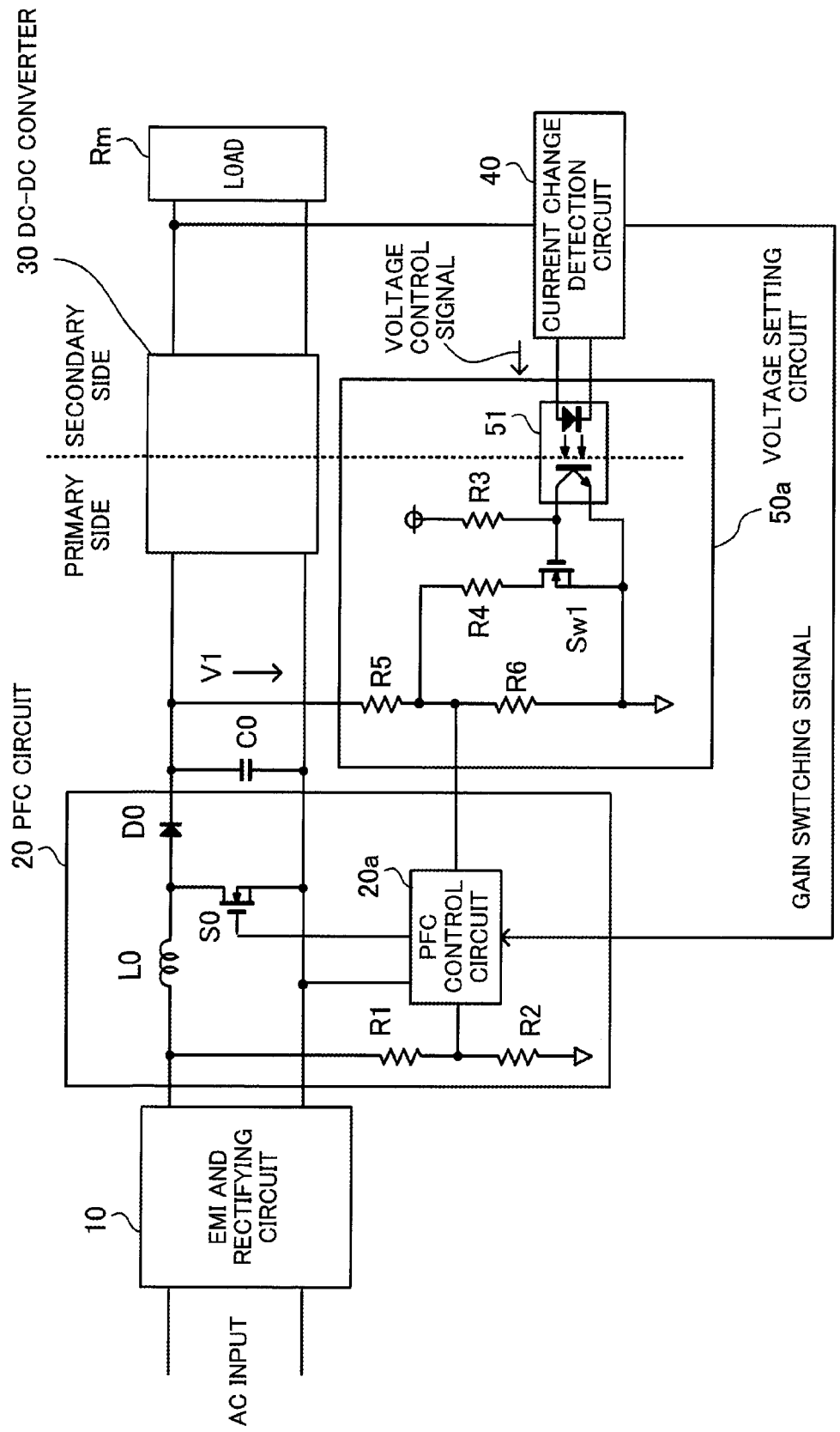
FIG. 12 illustrates an example of the structure of a voltage setting circuit.

The structure of the voltage setting circuit 50 will now be described. FIG. 12 illustrates an example of the structure of a voltage setting circuit. A voltage setting circuit 50a includes a photocoupler 51 for insulation transmission, a switching element Sw1, and resistors R3 through R6.

The DC-DC converter 30 includes a transformer and a primary side and a secondary side of the transformer are electrically insulated from each other. Accordingly, the photocoupler 51 is used to perform signal transmission while maintaining insulation.

A voltage control signal is inputted to an input end of the photocoupler 51. One end of the resistor R3 is pulled up and the other end of the resistor R3 is connected to a gate of the switching element Sw1 and one output end of the photocoupler 51.

One end of the resistor R5 is connected to the cathode of the diode D0, one end of the capacitor C0, and one input end of the DC-DC converter 30. The other end of the resistor R5 is connected to an input end of the PFC control circuit 20a, one end of the resistor R4, and one end of the resistor R6.

The other end of the resistor R4 is connected to a drain of the switching element Sw1. The other end of the resistor R6 is connected to GND, a source of the switching element Sw1, and the other output end of the photocoupler 51.

When a voltage control signal outputted from the current change detection circuit 40 is inputted to the photocoupler 51, the photocoupler 51 converts the inputted voltage control signal into light. A light receiving element is driven by the light and continuity takes place. As a result, an H-level signal is outputted. When a voltage control signal is not inputted to the photocoupler 51, continuity does not take place in the photocoupler 51.

Figure 13:
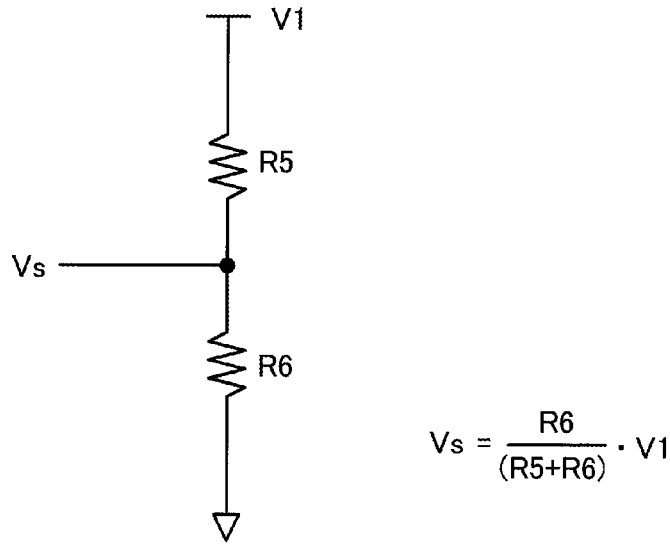
FIG. 13 illustrates voltage division by resistors.
Figure 13:
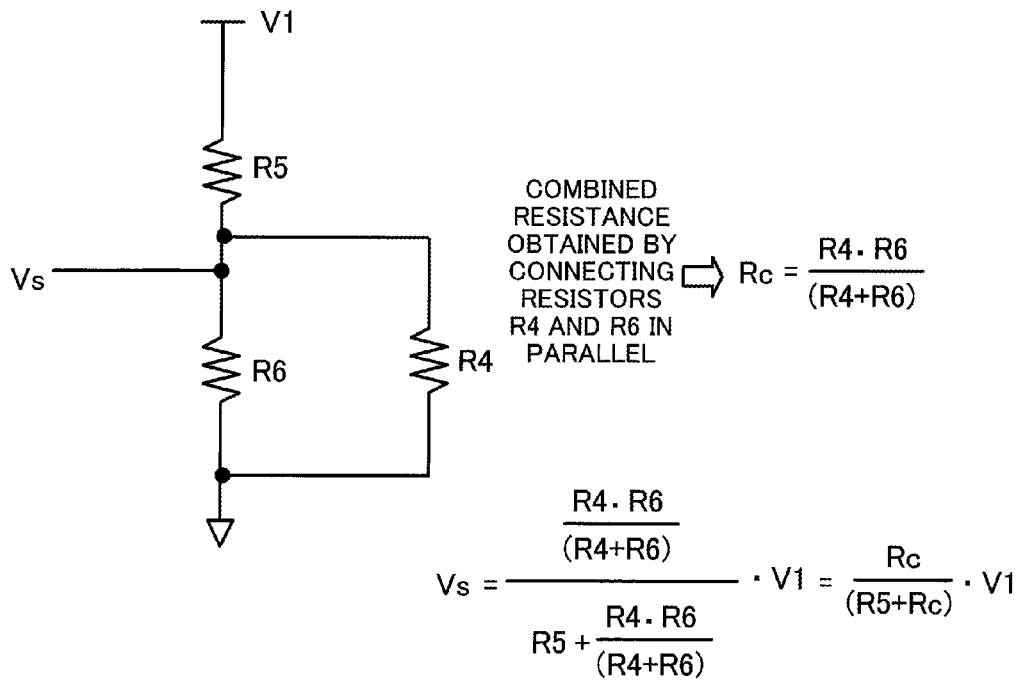

FIG. 13 illustrates voltage division by resistors. FIG. 13 illustrates two-stage voltage division by resistors in the voltage setting circuit 50a. The switching element Sw1 is in an OFF state for a disable interval for which a voltage control signal is not outputted from the current change detection circuit 40.

In this case, output voltage V1 from the PFC circuit 20 is divided by the resistors R5 and R6 and voltage obtained by the division is set voltage. That is to say, set voltage Vs obtained at this time is $(R6 \times V1)/(R5+R6)$.

On the other hand, the switching element Sw1 is in an ON state for a enable interval for which a voltage control signal is outputted from the current change detection circuit 40. In this case, a combined resistor obtained by connecting the resistors R4 and R6 in parallel and the resistor R5 are connected in series and voltage obtained by division is set voltage. Combined resistance Rc obtained by connecting the resistors R4 and R6 in parallel is $Rc=(R4 \times R6)/(R4+R6)$, so set voltage $Vs=(Rc \times V1)/(R5+Rc)$.

As has been described, in order to obtain set voltage, different voltage division ratios realized by the use of resistors are used in the voltage setting circuit 50a, at the time of dividing output voltage from the PFC circuit, for an enable interval for which a voltage control signal is outputted from the current change detection circuit 40 and a disable interval for which a voltage control signal is not outputted from the current change detection circuit 40. As a result, two voltage values are set by switching. In addition, voltage switching is performed by simple circuit structure.

Figure 14:
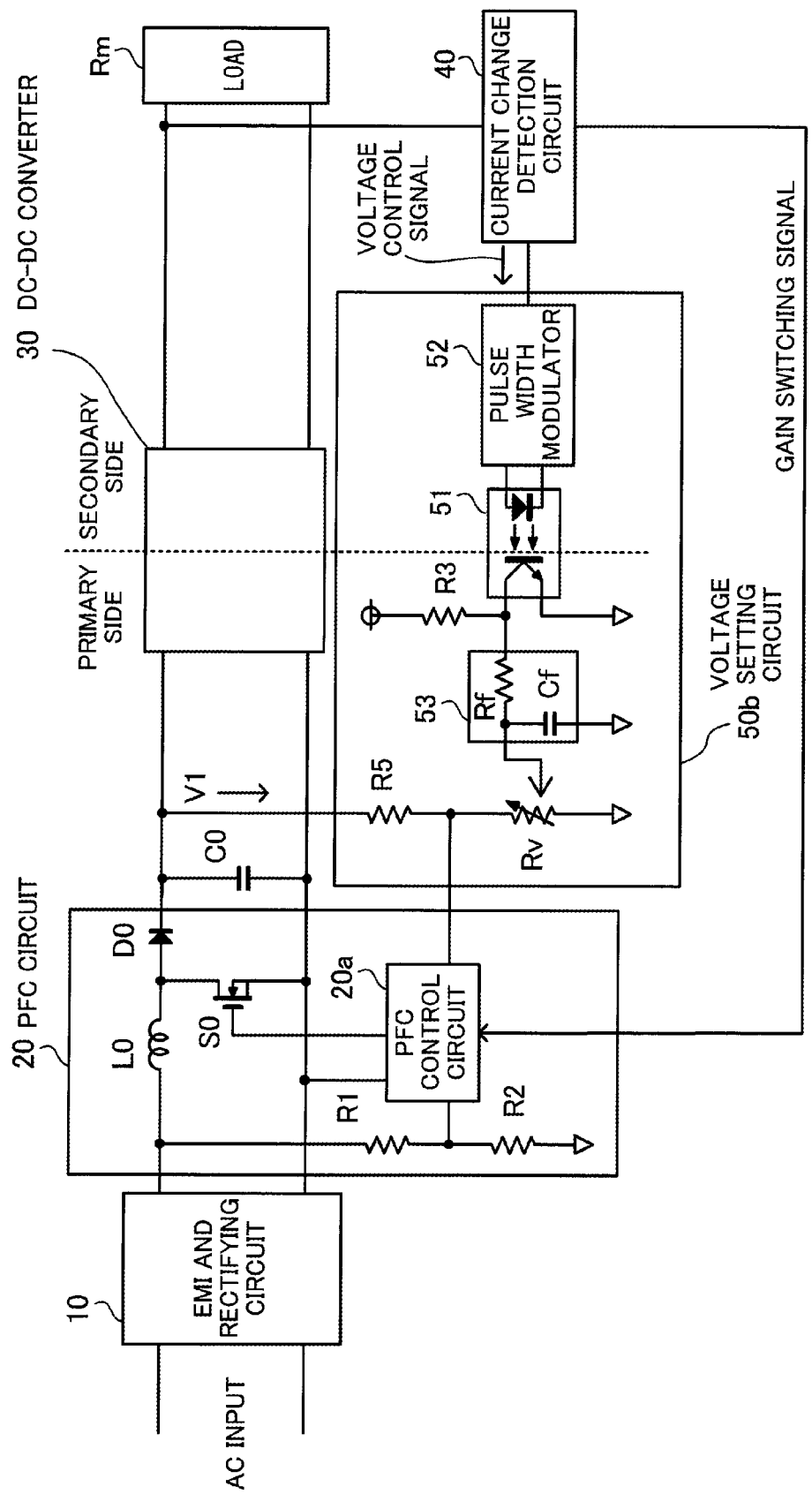
FIG. 14 illustrates an example of the structure of a voltage setting circuit.

FIG. 14 illustrates an example of the structure of a voltage setting circuit. A voltage setting circuit 50b includes a photocoupler 51 for insulation transmission, a pulse width modulator 52, a filter 53, resistors R3 and R5, and a variable resistor Rv.

A voltage control signal is inputted to an input end of the pulse width modulator 52. An output end of the pulse width modulator 52 is connected to an input end of the photocoupler 51. One end of the resistor R3 is pulled up and the other end of the resistor R3 is connected to one output end of the photocoupler 51 and one end of a resistor Rf in the filter 53. The other output end of the photocoupler 51 is connected to GND.

The other end of the resistor Rf is connected to one end of a capacitor Cf in the filter 53 and a variable control terminal of the variable resistor Rv. The other end of the capacitor Cf is connected to GND. One end of the resistor R5 is connected to the cathode of the diode D0, one end of the capacitor C0, and one input end of the DC-DC converter 30. The other end of the resistor R5 is connected to an input end of the PFC control circuit 20a and one end of the variable resistor Rv. The other end of the variable resistor Rv is connected to GND.

When a voltage control signal is outputted from the current change detection circuit 40 to the pulse width modulator 52, the pulse width modulator 52 generates and outputs a pulse-width-modulated signal (PWM signal) while the voltage control signal is being outputted from the current change detection circuit 40.

The photocoupler 51 receives the PWM signal and converts the received PWM signal into light. A light receiving element is driven by the light and continuity takes place. As a result, an H-level signal is outputted. When a PWM signal is not inputted to the photocoupler 51, continuity does not take place in the photocoupler 51.

The filter 53 low-pass-filters the signal outputted from the photocoupler 51 into a direct-current signal and inputs it to the variable control terminal of the variable resistor Rv. The variable resistor Rv changes its resistance value according to the width of an H-level signal outputted from the filter 53.

As has been described, the voltage setting circuit 50b generates a PWM signal by pulse-width-modulating a voltage control signal, and changes according to the pulse width of the PWM signal a resistance value used for dividing output voltage from the PFC circuit. By doing so, various voltage values are set.

As a result, various voltage values are flexibly set by switching. Furthermore, voltage switching is performed by simple circuit structure. In addition, voltage value switching is finely performed, so an overshoot is reduced.

Figure 15:
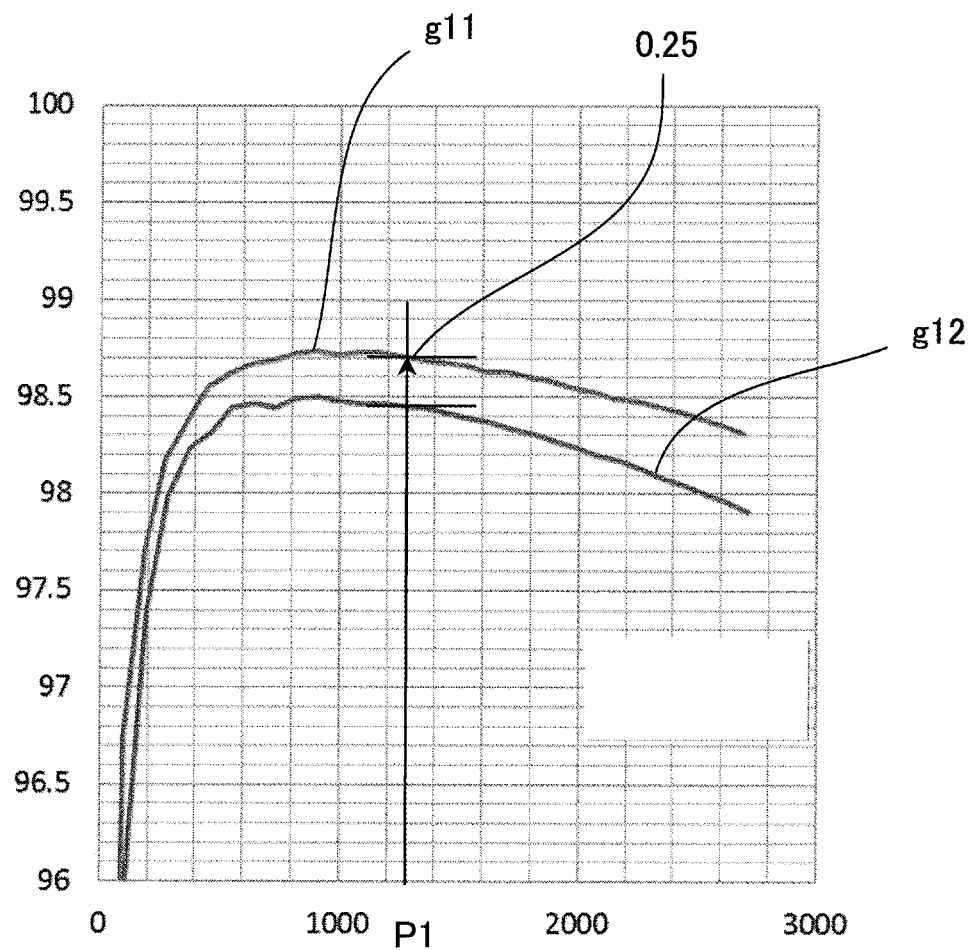
FIG. 15 indicates simulation results of the efficiency of switching power supplies.

Simulation results will now be described. FIG. 15 indicates simulation results of the efficiency of switching power supplies. In FIG. 15, a vertical axis indicates efficiency (%) and a horizontal axis indicates output power (W) from a PFC circuit. A graph g11 is an efficiency characteristic curve (375 V) of the switching power supply according to this embodiment. A graph g12 is an efficiency characteristic curve (400 V) of a conventional switching power supply.

As can be seen from FIG. 15, when output power is, for example, P1 (W), the efficiency of the switching power supply according to this embodiment in which output voltage from the PFC circuit is set to 375 V is 0.25 percent higher than that of the conventional switching power supply in which output voltage from the PFC circuit is set to 400 V.

Figure 16:
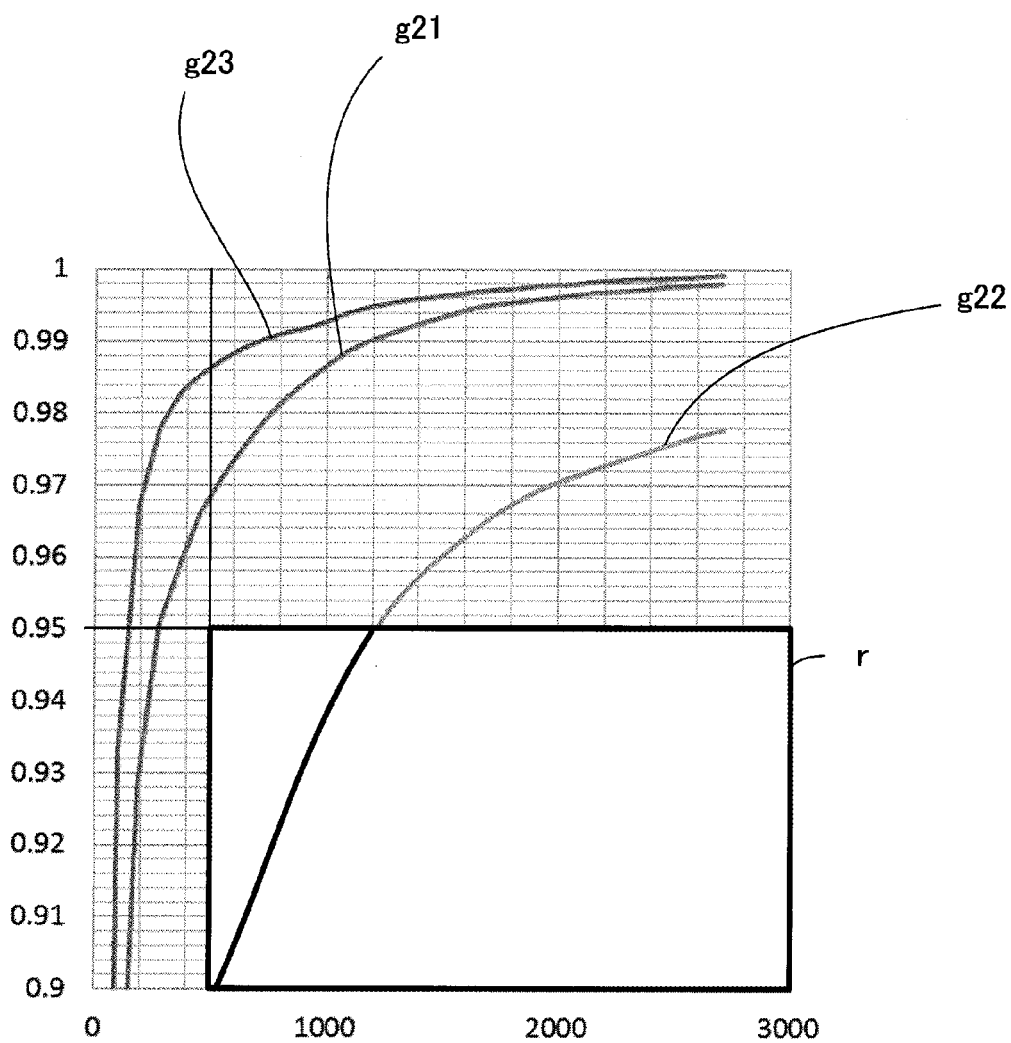
FIG. 16 indicates simulation results of power factors.

FIG. 16 indicates simulation results of power factors. In FIG. 16, a vertical axis indicates a power factor and a horizontal axis indicates output power (W) from a PFC circuit. A graph g21 is a power factor characteristic curve (375 V) of the switching power supply according to this embodiment. A graph g22 is a power factor characteristic curve (375 V) of a conventional switching power supply. A graph g23 is a power factor characteristic curve (400 V) of the conventional switching power supply.

An 80 Plus Titanium condition is not met in a region r. As can be seen from FIG. 16, however, the power factor of the switching power supply according to this embodiment does not fall within the region r and meets the 80 Plus Titanium condition.

"80 Plus" is one of the standards for the power conversion efficiency of power supply units for computers (certification standard given to electrical apparatus which realize an AC-DC conversion efficiency of 80 percent or greater). Furthermore, the 80 Plus standard has grades according to the degree of AC-DC conversion efficiency and a certification standard which is referred to as "Titanium" and which is the highest grade at this point of time is given to power supply units having an AC-DC conversion efficiency of 98 percent or greater.

The embodiment has been described. However, each component described in the embodiment may be replaced with another unit having the same function. In addition, any other component or process may be added.

According to an aspect, a decrease in the efficiency of a power supply is checked.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A power supply apparatus comprising:
   a PFC circuit configured to generate current that is in-phase with AC input voltage and that is practically sinusoidal to compensate for a power factor;
   a DC-DC converter configured to convert voltage of a signal outputted from the PFC circuit to determined voltage;
   a current change detection section configured to detect an amount of a change in current outputted from the DC-DC converter and output, when the detected amount of the change in current is larger than a threshold, a gain switching signal for a time a certain period longer than an interval during which the current outputted from the DC-DC converter is changing; and
   a control circuit configured to control the voltage of the signal outputted from the PFC circuit and to raise a degree of the control of the voltage to correct a deviation of the voltage from a determined value when the control circuit receives the gain switching signal.

2. The power supply apparatus according to claim 1, wherein when the current change detection section discontinues outputting the gain switching signal, the current change detection section outputs a voltage control signal for raising the voltage outputted from the PFC circuit to the determined value.

3. The power supply apparatus according to claim 2 further comprising a voltage setting section configured to set the voltage outputted from the PFC circuit to the determined value,
   wherein the voltage setting section:
   sets a first voltage value obtained by dividing the voltage outputted from the PFC circuit at a first voltage division ratio realized by using resistors for an enable interval of the voltage control signal; and
   sets a second voltage value obtained by dividing the voltage outputted from the PFC circuit at a second voltage division ratio realized by using resistors for a disable interval of the voltage control signal.

4. The power supply apparatus according to claim 2 further comprising a voltage setting section configured to set the voltage outputted from the PFC circuit to the determined value,
   wherein the voltage setting section:
   pulse-width-modulates the voltage control signal to generate a pulse-width-modulated signal; and
   changes a resistance value which is used for dividing the voltage outputted from the PFC circuit and which is realized by using resistors according to a pulse width of the pulse-width-modulated signal and sets various voltage values.

5. The power supply apparatus according to claim 1, wherein:
   when the detected amount of the change in current is larger than the threshold, the current change detection section recognizes that a first load fluctuation has taken place, and outputs the gain switching signal for controlling a decrease in the voltage outputted from the PFC circuit which is caused by the first load fluctuation; and
   after the current change detection section discontinues outputting the gain switching signal, the current change detection section outputs a voltage control signal for a certain time for raising the voltage outputted from the PFC circuit to the determined value, and controls a decrease in the voltage outputted from the PFC circuit which is caused by a second load fluctuation that possibly takes place after the first load fluctuation in the certain time.

* * * * *